March 31, 1925.

A. SMITH

CORN HARVESTER

Filed July 27, 1923

Inventor
Augustus Smith.
By [signature]
Attorney

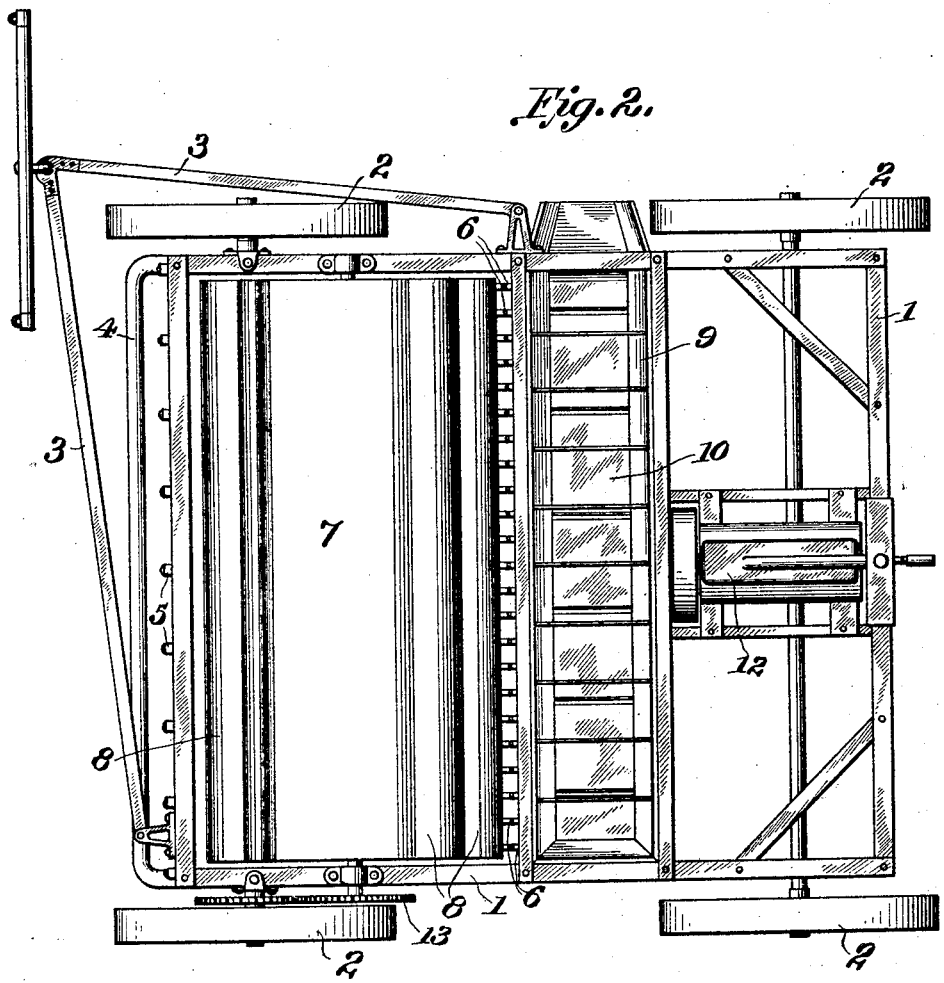

Patented Mar. 31, 1925.

1,531,521

UNITED STATES PATENT OFFICE.

AUGUSTUS SMITH, OF CHEYENNE WELLS, COLORADO.

CORN HARVESTER.

Application filed July 27, 1923. Serial No. 654,189.

*To all whom it may concern:*

Be it known that I, AUGUSTUS SMITH, a citizen of the United States, and a resident of Cheyenne Wells, in the county of Cheyenne and the State of Colorado, have invented certain new and useful Improvements in Corn Harvesters, of which the following is a specification.

This invention relates to a device for harvesting corn in which the carriage is drawn by horses and certain parts of the mechanism are driven by an engine mounted on the carriage.

The machine includes a bumper to knock down the stalks, forks to straighten them out into rows parallel with the path of travel of the device, a second set of forks which strip the ears from the stalks, aided by a revolving drum having knives that carry the corn so gathered up and over the drum and into a conveyer, and a sickle arranged to the rear of the second set of forks for cutting the stalks.

The invention consists in the novel features of construction hereinafter described, pointed out in the claim and shown in the accompanying drawings in which:—

Figure 2 is a top plan view.

Figure 1:
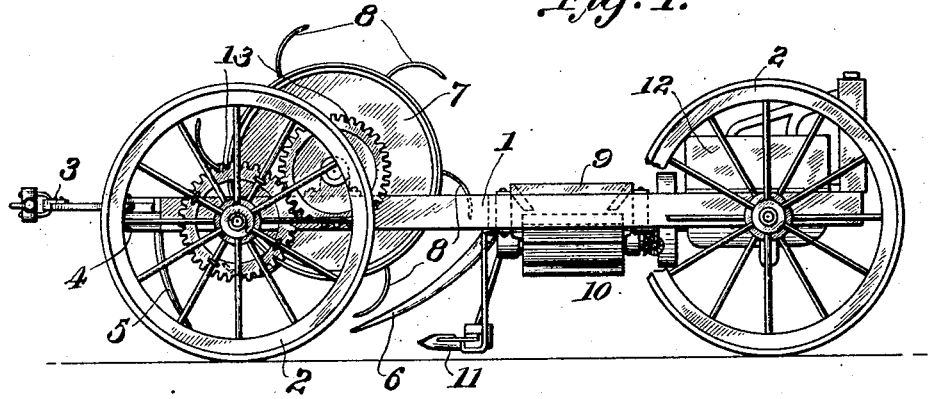
Figure 1 is a side elevation, parts being shown conventionally.
Figure 3:
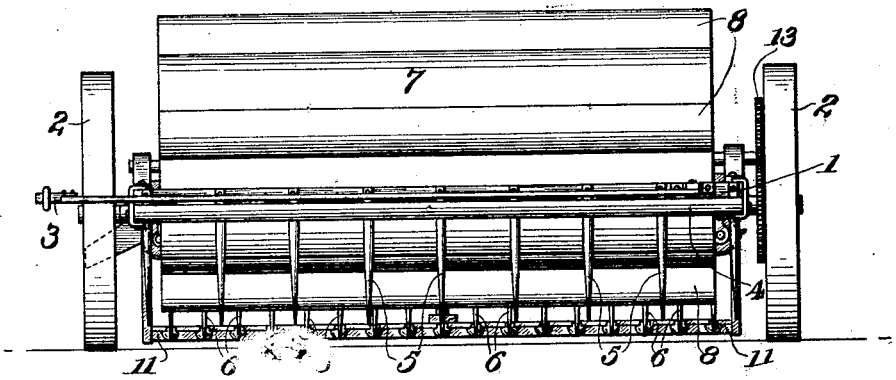
Figure 3 is a front elevation.

In these drawings 1 is a vehicle frame of any desired construction suitable to the purpose and supported on four wheels 2. A suitable draft rigging 3 is carried at the forward end. This end carries also a bumper or fender 4 designed to engage and knock down the stalks. It will be understood that the front bar, 3, of the draft rigging will assist the bumper in engaging and knocking down the stalks for a portion of its length. Affixed to the forward part of the frame are downwardly and rearwardly curved forks 5 which are arranged just to the rear of the bumper. These forks are spaced about one foot apart and straighten out the corn so that it lies parallel to the path of travel of the wheels 2. Secured to the frame, rearward of the forks, 5, is a second set of forks, 6, that curve downwardly and forwardly and are similar to the tines used on hay rakes, being spaced about an inch and a half apart.

Between the two sets of forks I mount a rotating drum 7. This drum carries longitudinally extending knives in the form of curved steel bars extending substantially the length of the drum. Preferably six of these knives, 8, are employed placed equi-distant apart and each being about eighteen inches wide. The rotation of the drum, 7, carrying the knives 8 catch the ears caught and held by the forks 6 and assist in pulling them from the stalks. These knives act also as conveyers so that the gathered ears are carried upwardly around the drum and then thrown centrifugally from it into a conveyer box 9 in which travels an endless belt 10, of any desired construction, which delivers the ears to a side box or other suitable receptacle, not shown.

To the rear of the forks 6 is arranged a reciprocating sickle blade 11 of the usual construction which cuts the stalks. An engine 12 is mounted on the rear of the vehicle and drives in any suitable manner the sickle blade and the endless belt. The drum 7 may be motor driven or may be rotated by gears 13 from the forward left hand wheel. I do not desire to be restricted to any particular means of driving these parts.

What I claim is:—

In a harvester of the kind described, a series of forks spaced substantially a foot apart and curving downwardly and rearwardly, a second series of forks arranged to the rear of the first set and curved downwardly and forwardly, the tines of the second set being spaced about one and one half inches apart, a drum rotating between the forks of the first and second sets, combined knives and conveyers carried by the drum adapted to pull ears from the second set of forks and carry them from the forks to the top of the drum, a box to the rear of the drum extending transversely of the vehicle and adapted to receive ears from the drum, and an endless conveyer in said box adapted to carry the ears to a designated receptacle.

In testimony whereof I affix my signature.

AUGUSTUS SMITH.